April 10, 1962   E. L. BUSH   3,029,135
PURIFICATION OF GASES USED IN THE PRODUCTION OF SILICON
Filed April 8, 1959   2 Sheets-Sheet 1
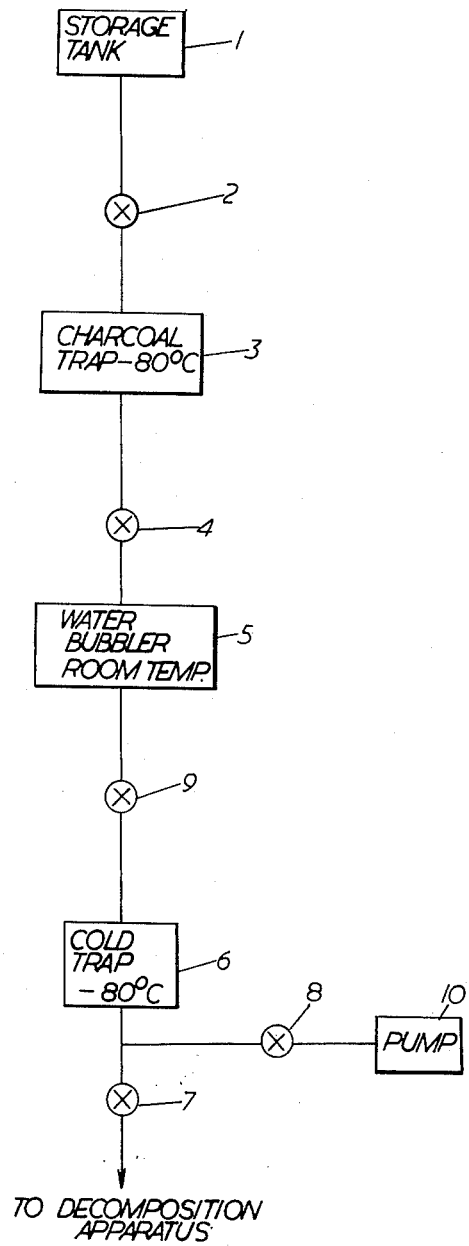
FIG. I
Inventor
E. L. Bush
By
Attorney

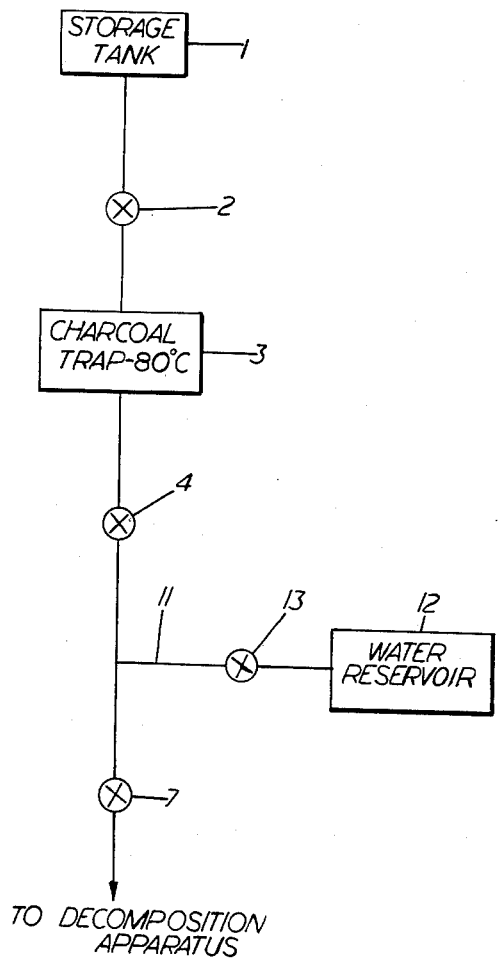

3,029,135
PURIFICATION OF GASES USED IN THE
PRODUCTION OF SILICON
Eric Langley Bush, London, England, assignor to International Standard Electric Corporation, New York, N.Y., a corporation of Delaware
Filed Apr. 8, 1959, Ser. No. 805,051
Claims priority, application Great Britain May 16, 1958
2 Claims. (Cl. 23—223.5)

This invention relates to the production of substantially pure silicon.

It is known that silicon for use in semiconductor devices may readily be produced by the thermal decomposition of silane. One important aspect of such a process is the purity of the silicon thus obtainable due to the possibility of the ready removal of the impurities from the reagents used in the preparation of silane.

One of the most troublesome impurities in silicon intended for use in semi-conductor devices is boron. Boron combined as diborane may occur in very small quantities mixed with silane.

In co-pending application E. L. Bush, U.S. Serial No. 758,819, filed September 3, 1958, now abandoned, it is proposed to reduce the quantity of diborane present in the silane by introducing into the vessel in which the silane is stored a small quantity of water vapour. The water vapour hydrolyses the diborane, to a non-volatile product.

In one method according to application No. 758,819, a trace of water vapour is introduced into a storage tank containing silane gas having diborane impurities, and the water vapour and diborane are allowed to react for a period of not less than 24 hours. When the resultant mixture has been passed through a charcoal trap at $-80°$ C. to remove or at least to reduce substantially any arsine or phosphine impurity which may be present, as proposed in co-pending application E. L. Bush, U.S. Serial No. 716,652, filed February 21, 1958, now Patent No. 2,987,139, and the silane has been decomposed at reduced pressure to silicon, the silicon obtained has a p-type resistivity in the region 1000–3000 ohm cms.

It is the object of the present invention to provide a method of reducing the boron content in gases used in the production of silicon even further, to produce silicon having a p-type resistivity greater than 3000 ohm cms.

Accordingly the present invention provides a method of producing substantially pure silicon comprising adding water vapour to substantially pure silane gas and heating the mixture to a temperature at least equal to the decomposition temperature of silane.

In the method of preparing silicon described in application No. 758,819 the mixture of silane and parts per thousand million of the impurity hydrides which is fed to the decomposition stage is absolutely dry, since all traces of water vapour are removed from it when it is passed through the charcoal trap at $-80°$ C. I have now found that, if a trace of water vapour is added to this mixture just before the decomposition of the silane at reduced pressure is carried out, the silicon produced has a p-type resistivity of 3000–6000 ohm cms.

A possible explanation of this improved result is that the trace of water vapour entering the decomposition zone with the silane can react with any diborane present at a temperautre of 1200° C. in an atmosphere of silane and hydrogen, the hydrogen being that which is formed when the silane is decomposed. The diborane is oxidised by the water vapour to an oxide of boron which at that temperature is volatile and so is carried away from the silicon boule.

Any water which reacts with the silane or silicon forms the volatile silicon monoxide which, provided that it is only formed in small quantities, does not contaminate the silicon, and is pumped away with the hydrogen and the volatile oxide of boron.

It has also been found that, if there is too much water present during the decomposition of the silane, then so much silicon monoxide is formed that it is not efficiently removed and it contaminates the silicon. This contaminated silicon fumes on melting.

Embodiments of the invention will be described with reference to the accompanying drawings.

FIGS. 1 and 2 of which are flow sheets setting out the stages of the embodiments.

Referring to FIG. 1 of the drawings there is represented at 1 a storage tank in which substantially pure silane prepared by a known method, for example that disclosed in British patent specification No. 745,698, is stored. A small quantity of water vapour (e.g. between 0.1% and 1% by volume, the amount is not critical) is added to the silane in the storage tank 1 and is allowed to react with the diborane impurity present in the silane for a period of not less than 24 hours. When this period is complete, the silane is fed from the storage tank 1 through a valve 2, charcoal trap 3 which is kept at $-80°$ C. and a valve 4 to a water bubbler 5 at room temperature. As the silane passes through the water bubbler 5 it acquires a considerable quantity of water vapour.

The silane mixed with water vapour is passed from the water bubbler 5 through a valve 9 and a cold trap 6. The gas emerging from the cold trap 6 is that which is passed to the decomposition apparatus for the silane to be thermally decomposed to produce silicon. The decomposition apparatus is not shown but it may be of any suitable type, for example that described is specification 745,698. In a preferred process for producing silicon by the thermal decomposition of silane, the latter is decomposed when present at a molecular concentration substantially less than normal. To this end the silane is drawn into the decomposition chamber at a reduced pressure through a valve 7.

A pump 10 is provided as shown to remove from the cold trap 6 the water which collects there during the passage of the silane. A valve 8 is provided so that the pump 10 can be isolated during the flow of the silane.

The quantity of water vapour which is present in the mixture of silane and impurities which is fed to the decomposition apparatus may be varied by varying the temperature of the cold trap 6. At $-80°$ C., for example, the vapour pressure of water is $4\times10^{-4}$ mm. and this pressure of water vapour present in the silane emerging from the cold trap 6 is equal to approximately 0.5 part per million of water vapour. On the other hand, the vapour pressure of water at 0° C. is 4.58 mm. so that if a trap is maintained at 0° C. a silane mixture containing 0.5% of water vapour is obtained. As will be shown later this is too great a quantity of water vapour in the mixture for pure silicon to be obtained in the thermal decomposition.

The correct concentration of water vapour to be added to the silane before the decomposition stage has to be determined between the limits set by the amount necessary to remove the diborane present in the silane and the amount which will cause contamination of the silicon with oxygen.

From the decomposition of silane treated in accordance with the method described above there have been obtained silicon boules which melt very cleanly and have p-type resistives up to 6,000 ohms cms.

For example, in a series of experiments carried out using a particular sample of silane which had been treated by the method of co-pending application No.

758,819 to reduce its boron impurity, the following results were obtained:

| Amount of water present during the decomposition | P-type resistivity of silicon obtained. |
|---|---|
| None | 2,000 ohm cms. |
| 0.5 part per million by volume | 3,000–6,000 ohm cms. |
| 0.5 % volume for volume | 300 ohm cms. silicon fuming. |
| 1% volume for volume | 100 ohm cms. silicon fuming. |

It is evident that in this case the best result is given with a concentration of water vapour of .5 part per million, which is of the order of 500 times the usual amount of boron compounds present as impurities. Accordingly, whilst no further improvement is to be expected from using larger amounts of water vapour than this it has been found that amounts up to 10 parts per million (i.e. of the order of 10,000 times the usual amounts of boron compounds present as impurities) can be used without causing fuming of the silicon.

FIG. 2 of the drawings illustrate an alternative method of introducing a controlled amount of water vapour into the silane immediately before the decomposition stage. As before the preliminary stages comprise a storage tank 1, valve 2, charcoal trap at −80° C., 3, and a valve 4. However, after the silane emerges from the valve 4, water vapour is introduced by means of a water diffusion tube 11 instead of a water bubbler.

This water diffusion tube consists of a hollow copper tube connected between the main silane supply line and a water reservoir 12. A control valve 13 is provided for sealing off the remainder of the apparatus during servicing of the water reservoir 12.

During operation the tube 11 and the space above the water in the water reservoir 12 contain silane gas. However, whilst the silane in the reservoir 12 is completely saturated with water vapour that silane at any point along the tube 11 contains a smaller amount, depending on its distance from the water reservoir 12 and the rate of diffusion of the water vapour along the tube. Accordingly, by varying the length of the tube or its cross sectional area, and hence the rate of diffusion, it is possible to vary the concentration of water vapour at the end of tube 11 adjoining the main silane supply line, and hence the amount picked up by the stream of silane and carried into the decomposition apparatus.

While the principles of the invention have been described above in connection with specific embodiments, and particular modifications thereof, it is to be clearly understood that this description is made only by way of example and not as a limitation on the scope of the invention.

What I claim is:

1. A method of producing substantially pure silicon comprising storing substantially pure silane gas containing a trace of gaseous boron compounds in the presence of water vapor for at least 24 hours, passing said gas through a charcoal trap at −80° C. whereby substantially all traces of water vapor are removed and arsine and phosphine impurities are substantially reduced, diffusing 0.5 to 10 parts per million of water vapor into said silane gas and heating the mixture of gas and water vapor in a molecular concentration substantially less than normal to a temperature at least equal to the decomposition temperature of silane, the amount of water vapor added being sufficient to hydrolyse during the decomposition process the remaining gaseous boron compounds present as impurities whereby the boron impurities are made non-reactive with said silicon.

2. A method of producing substantially pure silicon according to claim 1, further comprising adjusting the water content of said silane gas immediately downstream of the charcoal trap by the steps of bubbling said silane gas stream through water whereby the water content of the silane is increased and passing said silane gas through a cold trap at minus 80 degrees centigrade whereby the water vapor content of said silane gas is controlled to equal the amount of water vapor said silane gas can contain at said temperature.

References Cited in the file of this patent
FOREIGN PATENTS
745,698    Great Britain _____ Feb. 29, 1956
OTHER REFERENCES Hassler: "Active Carbon," Chemical Publ. Co., Inc. (1951), page 260.

Stock et al.: "Zeitschrift für anorganische and allgemeine Chemie," vol. 188 (1930), page 34.